(12) United States Patent
Zhang et al.

(10) Patent No.: US 11,402,598 B2
(45) Date of Patent: Aug. 2, 2022

(54) LENS MODULE

(71) Applicant: AAC Optics Solutions Pte. Ltd., Singapore (SG)

(72) Inventors: Jin Zhang, Shenzhen (CN); Gang Li, Shenzhen (CN); Jiliang Lu, Shenzhen (CN); Linzhen Li, Shenzhen (CN)

(73) Assignee: AAC Optics Solutions Pte. Ltd., Singapore (SG)

(*) Notice: Subject to any disclaimer, the term of this patent is extended or adjusted under 35 U.S.C. 154(b) by 168 days.

(21) Appl. No.: 16/916,152

(22) Filed: Jun. 30, 2020

(65) Prior Publication Data

US 2020/0409029 A1 Dec. 31, 2020

(30) Foreign Application Priority Data

Jun. 30, 2019 (WO) ................ PCT/CN2019/094061

(51) Int. Cl.
   *G02B 7/02* (2021.01)
   *G02B 27/64* (2006.01)
   *G02B 7/09* (2021.01)

(52) U.S. Cl.
   CPC ............. *G02B 7/02* (2013.01); *G02B 27/646* (2013.01); *G02B 7/09* (2013.01)

(58) Field of Classification Search
   None
   See application file for complete search history.

(56) References Cited

U.S. PATENT DOCUMENTS

2018/0031859 A1\* 2/2018 Gomyo .................... G02B 7/09

\* cited by examiner

*Primary Examiner* — William R Alexander
*Assistant Examiner* — Tamara Y. Washington
(74) *Attorney, Agent, or Firm* — W&G Law Group (57) ABSTRACT

A lens module is provided. In the lens module, a conductive member is provided with a connecting hole at a position facing a recess of a connector, which is fixedly connected to a holding assembly. An end of each holding member included in the holding assembly is soldered to the connecting hole through the recess, and the connecting hole is a through hole circumferentially closed. By setting the connecting hole as a through hole sealed circumferentially, it may be ensured that an end of the holding member that goes through the connecting hole may be provided with solder paste all around. The holding member may be stably soldered to the conductive member, thereby ensuring transmission of electrical signals between the holding member and the conductive member, and further ensuring transmission of electrical signals between an image stabilization device and an auto focusing device.

8 Claims, 7 Drawing Sheets

LENS MODULE

TECHNICAL FIELD

The present disclosure relates to the technical field of lens optical imaging, in particular to a lens module.

BACKGROUND

In recent years, a high-performance lens module is installed on portable terminals such as smart phones and tablet computers. Generally, the high-performance lens module has auto focusing (AF) and optical image stabilization (OIS) functions. The high-performance lens module needs to move a lens in the direction of an optical axis of the lens during auto-focusing, and needs to move the lens in a direction perpendicular to the direction of the optical axis of the lens when implementing the optical image stabilization function. In the existing technology, an AF assembly (including a lens, a lens base, etc.) is suspended in a lens module through multiple suspension wires that not only hold the AF assembly, but are also conductive. The suspension wires can transfer electrical signals from an OIS assembly to the AF assembly. One end of each suspension wire is connected to a conductive member provided on the AF assembly. However, due to a design defect in an existing conductive member, when a suspension wire is soldered to the conductive member, solder paste cannot be applied all around, thereby affecting stability of the suspension wire soldered to the conductive member, which in turn affects electrical signal transmission between the suspension wire and the conductive member, and affects electrical signal transmission between the OIS assembly and the AF assembly.

Therefore, it is necessary to provide an improved lens module to solve the above problem.

SUMMARY

The present disclosure seeks to provide a lens module to solve the technical problem of poor electrical signal transmission performance between an image stabilization device and an auto focusing device.

The technical solution of the present disclosure is as follows: a lens module, including a base, a lens base and a holding assembly configured to hold the lens base; the lens base being suspended within the base by the holding assembly; the lens base including a connector configured to fixedly connect the holding assembly and a conductive member disposed on the connector; the connector being provided with a recess, the conductive member being provided with a connecting hole at a position facing the recess, the holding assembly including at least two holding members, one end of each of the holding members being fixed relative to the base while the other end of each of the holding members being soldered to the connecting hole of the conductive member through the recess, and the connecting hole being a through hole circumferentially closed.

As an improvement, the lens base further includes a bottom, a lens holder with a lens and installed at the bottom, and a shape memory alloy wire configured to drive the lens holder to move in a direction of an optical axis of the lens. The bottom is provided with a binding clamp. The shape memory alloy wire includes an end connected to the binding clamp and a drive end connected to the lens holder. The conductive member includes a first conductive member disposed adjacent to the binding clamp. The first conductive member and the binding clamp are opposite to each other, and there is a distance between the first conductive member and the binding clamp.

As an improvement, the first conductive member is provided with a notch at a side facing the binding clamp, and a distance between the side with the notch of the first conductive member and the binding clamp ranges from 0.05 mm to 0.15 mm.

As an improvement, the bottom is square. The bottom includes four side plates disposed circumferentially and four corners located respectively between adjacent side plates. There are four connectors respectively disposed at corners of the bottom and extending away from a direction of a central line of the bottom. There are four holding members, and each holding member is fixedly connected to one of the connectors. One of the side plates is installed with a first circuit board. The shape memory alloy wire includes two ends, the drive end is disposed between the two ends. Each of the ends is connected to one respective binding clamp, and two binding clamps are respectively fixed to two side plates opposite to each other.

As an improvement, the conductive member includes two first conductive members disposed symmetrically relative to a central line of the bottom, and two second conductive members disposed symmetrically relative to another central line of the bottom. The two first conductive members are respectively disposed at an upper end of the connector corresponding to the two binding clamps, and the two second conductive members are respectively disposed at upper ends of the other two connectors.

As an improvement, the first conductive member further includes a first soldering section bent and disposed at a side opposite to the connecting hole, and the second conductive member further includes a second soldering section soldered to the first circuit board.

As an improvement, four side plates disposed circumferentially of the bottom are considered as a first side plate, a second side plate, a third side plate and a fourth side plate, where a side plate installed with the first circuit board is the third side plate, the fourth side plate is opposite to the third side plate, and the first side plate and the second side plate are opposite to each other and are respectively connected between the third side plate and the fourth side plate. The lens module further includes two electrical connectors disposed symmetrically, the two electrical connectors are respectively attached to the first side plate and the second side plate, and each electrical connector includes a third soldering section, soldered to the first circuit board, and a fourth soldering section, that is bent to the fourth side plate and soldered to the first soldering section. The first circuit board includes two terminals respectively bent and extending to the first side plate and the second side plate, and the third soldering section is soldered to the terminals.

As an improvement, the base includes a substrate and a frame fixed to the substrate. The substrate and the frame form an accommodating space configured to accommodate the lens base. The first side plate and the second side plate are respectively provided with a first protrusion at an outside away from the optical axis, each electrical connector is provided with a through hole corresponding to the first protrusion, and each electrical connector is engaged with the first protrusion through the through hole and the electrical connectors are respectively attached to the first side plate and the second side plate.

As an improvement, the third side plate is provided with a second protrusion at an end away from the substrate and at an outside away from the optical axis, and the fourth side plate is provided with a third protrusion at an outside away from the optical axis. The first protrusion, the second protrusion and the third protrusion collectively define a movement of the lens base in a direction perpendicular to the direction of the optical axis of the lens.

As an improvement, the lens module further includes a housing sleeved on the base. The housing includes a top wall and a side wall. The side wall is fixed to the substrate, and an end of the frame away from the substrate is connected with the top wall. The first side plate and the second side plate are further respectively provided with a fourth protrusion at an end away from the substrate. The fourth protrusion is configured to define a movement of the lens base in the direction of the optical axis of the lens away from the substrate.

The present disclosure is advantageous in: by setting the connecting hole on the conductive member as a through hole sealed circumferentially, it may be ensured that an end of the holding member, that goes through the connecting hole, may be provided with solder paste all around. The holding member may be stably soldered to the conductive member, thereby ensuring transmission of electrical signals between the holding member and the conductive member, and further ensuring transmission of electrical signals between the image stabilization device and the auto focusing device.

REFERENCE SIGNS 100, lens module; 1, base; 11, substrate; 12, frame; 2, lens base; 21, bottom; 211, first side plate; 212, second side plate; 213, third side plate; 214, fourth side plate; 215, first protrusion; 216, second protrusion; 217, third protrusion; 218, fourth protrusion; 22, lens holder; 23, connector; 231, recess; 24, shape memory alloy wire; 241, end; 242, drive end; 25, binding clamp; 3, conductive member; 31, first conductive member; 311, notch; 312/321, connecting hole; 313, first soldering section; 32, second conductive member; 322, second soldering section; 4, holding assembly; 41, holding member; 5, drive assembly; 6, first circuit board; 61, terminal; 7, second circuit board; 8, housing; 81, top wall; 82, side wall; 9, electrical connector; 91, third soldering section; 92, fourth soldering section; 93, through hole.

DETAILED DESCRIPTION

A further description is provided in the following for the present disclosure with reference to the drawings and an embodiment.

With reference to FIGS. 1-11, an embodiment of the present disclosure provides a lens module 100 including a base 1, a lens base 2 and a holding assembly 4 configured to hold the lens base 2. The holding assembly 4 includes multiple holding members 41. The lens base 2 is suspended within the base 1 by the holding assembly 4. The lens module 100 further includes a drive assembly 5 configured to drive the lens base 2 to move in a direction perpendicular to a direction of an optical axis of the lens. The drive assembly 5 is disposed between the lens base 2 and the base 1. The base 1 includes a substrate 11 and a frame 12 fixed to the substrate 11. The substrate 11 and the frame 12 form an accommodating space configured to accommodate the lens base 2.

With reference to FIG. 2 and FIGS. 4-6, the lens base 2 includes a connector 23, configured to fixedly connect the holding assembly 4, and a conductive member 3, disposed on the connector 23. The connector 23 is provided with a recess 231. The conductive member 3 is provided with a connecting hole 312/321 at a position facing the recess 231. The holding assembly 4 includes at least two holding members 41. One end of each of the holding members 41 is fixed relative to the base 1 while the other end of each of the holding members 41 is soldered to the connecting hole 312/321 of the conductive member 3 through the recess 231, and the connecting hole 312/321 is a through hole circumferentially closed. The holding member 41 is made of high-strength conductive metal, has good holding strength and conductivity, and may transmit electrical signals from an image stabilization device to an auto focusing device. By setting the connecting hole 312/321 on the conductive member 3 as a through hole sealed circumferentially, it may be ensured that an end of the holding member 41 that goes through the connecting hole 312/321 may be provided with solder paste all around. The holding member 41 may be stably soldered to the conductive member 3, thereby ensuring transmission of electrical signals between the holding member 41 and the conductive member 3, and further ensuring transmission of electrical signals between the image stabilization device and the auto focusing device.

The lens base 2 further includes a bottom 21, a lens holder 22 with a lens (not shown) and installed at the bottom 21, and a shape memory alloy wire 24 configured to drive the lens holder 22 to move in a direction of an optical axis of the lens. The bottom 21 is provided with a binding clamp 25. The shape memory alloy wire 24 includes an end 241 connected to the binding clamp 25 and a drive end 242 connected to the lens holder 22 (see FIG. 4 for reference). The conductive member 3 includes a first conductive member 31 disposed adjacent to the binding clamp 25. The first conductive member 31 and the binding clamp 25 are opposite to each other, and there is a distance L between the first conductive member and the binding clamp. By setting the distance L between the first conductive member 31 and the binding clamp 25, it may ensure that the first conductive member 31 and the binding clamp 25 do not contact each other and keep distance between each other especially when the lens module 100 sways, thereby preventing the device from being damaged due to short circuit.

Figure 7:
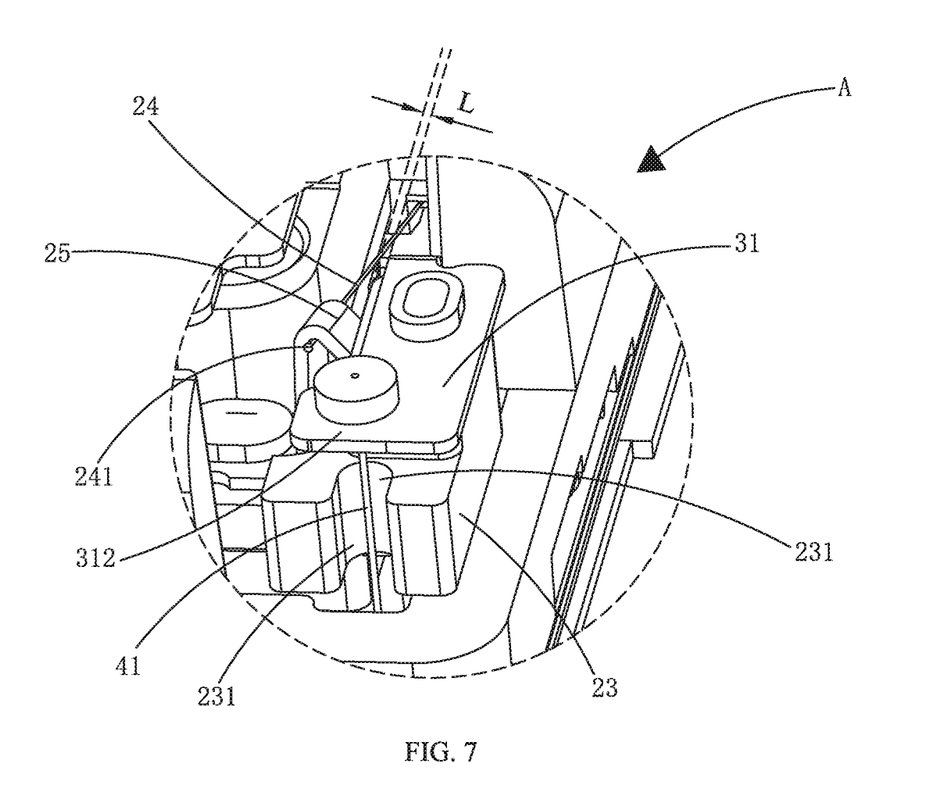
FIG. 7 is a schematic zoomed-in view of A in FIG. 3.
Figure 8:
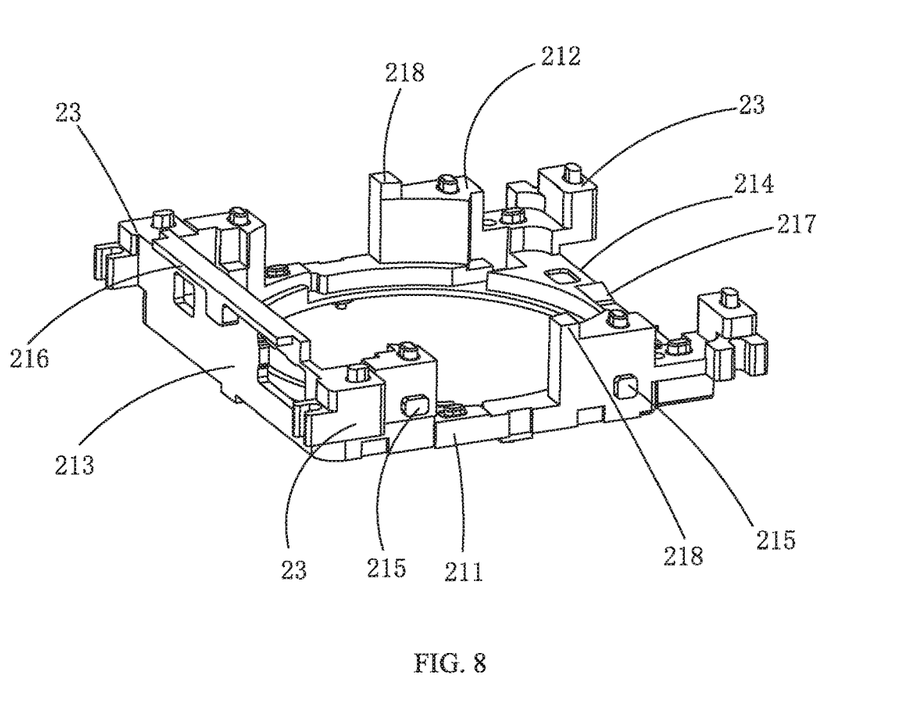
FIG. 8 is a schematic three-dimensional structural view of a bottom according to the embodiment of the present disclosure.

With reference to FIG. 7, the first conductive member 31 is provided with a notch 311 at a side facing the binding clamp 25, and a distance L between the side with the notch 311 of the first conductive member 31 and the binding clamp 25 ranges from 0.05 mm to 0.15 mm. In an embodiment, the distance L is set as 0.1 mm. By setting the distance L between the first conductive member 31 and the binding clamp 25, it may be ensured that the first conductive member 31 and the binding clamp 25 do not contact each other when the lens module 100 sways.

With reference to FIGS. 2-4 and 8, the bottom 21 is square. The bottom 21 includes four side plates disposed circumferentially and four corners located respectively between adjacent side plates. There are four connectors 23 respectively disposed at corners of the bottom 21 and extending away from a direction of a central line of the bottom 21. There are four holding members 41, and each holding member is fixedly connected to one of the connectors 23. One of the side plates is installed with a first circuit board 6 (see FIG. 10 for reference). The first circuit board 6 is configured to supply power to the lens base 2. The shape memory alloy wire 24 includes two ends 241. The drive end 242 is disposed between the two ends 241. Each of the ends 241 is connected to one respective binding clamp 25, and two binding clamps 25 are respectively fixed to two side plates opposite to each other.

The conductive member 3 includes two first conductive members 31 disposed symmetrically relative to a central line of the bottom 21, and two second conductive members 32 disposed symmetrically relative to another central line of the bottom 21. The two first conductive members 31 are respectively disposed at an upper end of the connector 23 corresponding to the two binding clamps 25. The first conductive member 31 further includes a first soldering section 313 bent and disposed at a side opposite to the connecting hole 312. First soldering sections 313 of the two first conductive members 31 are disposed facing each other. The two second conductive members 32 are respectively disposed at upper ends of the other two connectors 23. The second conductive member 32 further includes a second soldering section 322 soldered to the first circuit board 6.

Specifically, four side plates disposed circumferentially of the bottom 21 are considered as a first side plate 211, a second side plate 212, a third side plate 213 and a fourth side plate 214. Herein, a side plate installed with the first circuit board 6 is the third side plate 213, the fourth side plate 214 is opposite to the third side plate 213, and the first side plate 211 and the second side plate 212 are opposite to each other and are respectively connected between the third side plate 213 and the fourth side plate 214. The two first conductive members 31 are respectively installed on the connectors 23 at the corners formed by the first side plate 211, the second side plate 212 and the fourth side plate 214. The two second conductive members 31 are respectively installed on the connectors 23 at the corners formed by the first side plate 211, the second side plate 212 and the third side plate 213.

Figure 1:
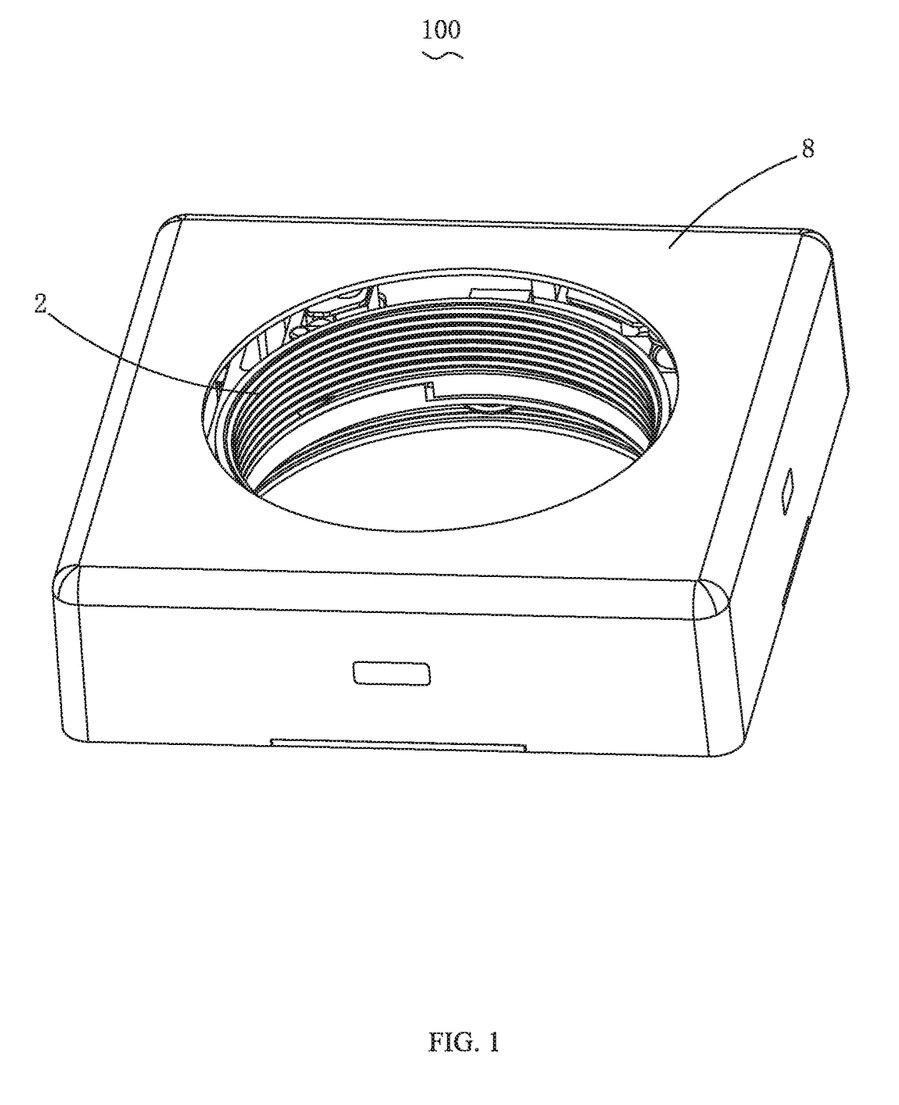
FIG. 1 is a schematic three-dimensional structural view of a lens module according to an embodiment of the present disclosure.
Figure 2:
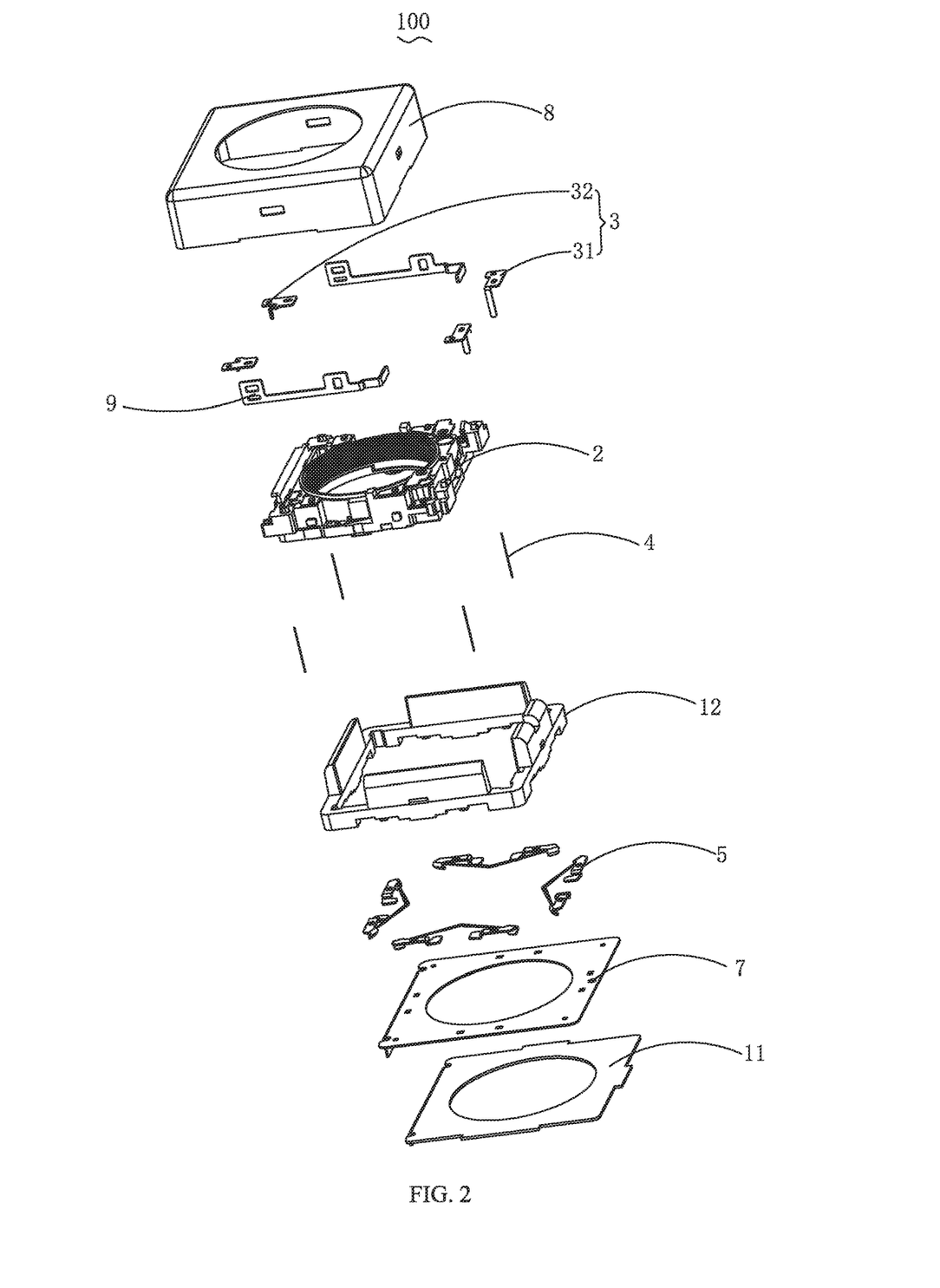
FIG. 2 is a schematic exploded structural view of the lens module according to the embodiment of the present disclosure.
Figure 3:
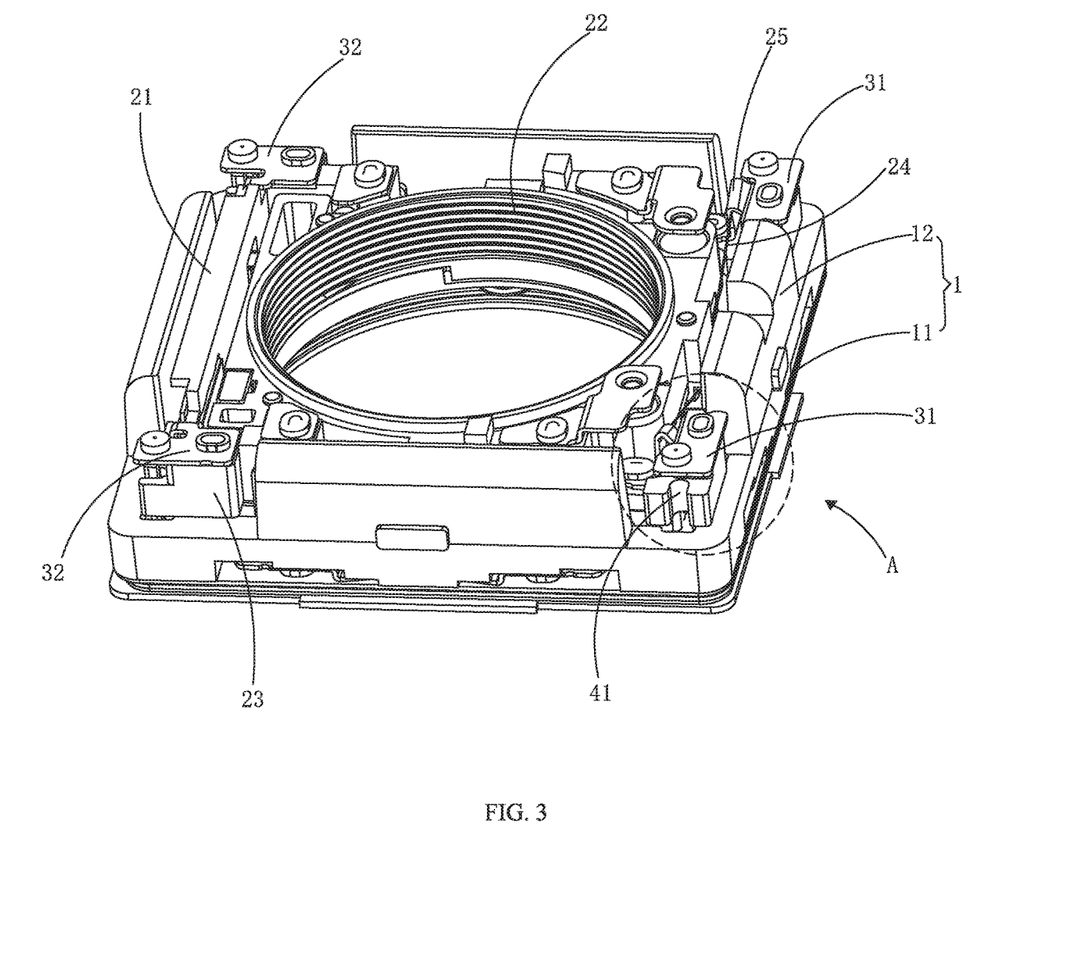
FIG. 3 is a schematic three-dimensional structural view of the lens module without a housing according to the embodiment of the present disclosure.

The lens module 100 further includes a second circuit board 7 that supplies power to the drive assembly 5 and the holding assembly 4 (see FIG. 2 for reference). The second circuit board 7 is fixed on the base 1 and is located between the lens base 2 and the base 1. The lens module 100 includes four holding members 41. Herein one end of each of two holding members 41 is electrically connected to the first conductive members 31 through the connecting hole 312, while one end of each of the other two holding members is electrically connected to the second conductive members 32 through the connecting hole 321. The other ends of the four holding members 41 are fixed on and electrically connected to the second circuit board 7. The four holding members 41 may not only stably hold the lens base 2, but also transmit current from the image stabilization module to the auto focusing module.

Figure 4:
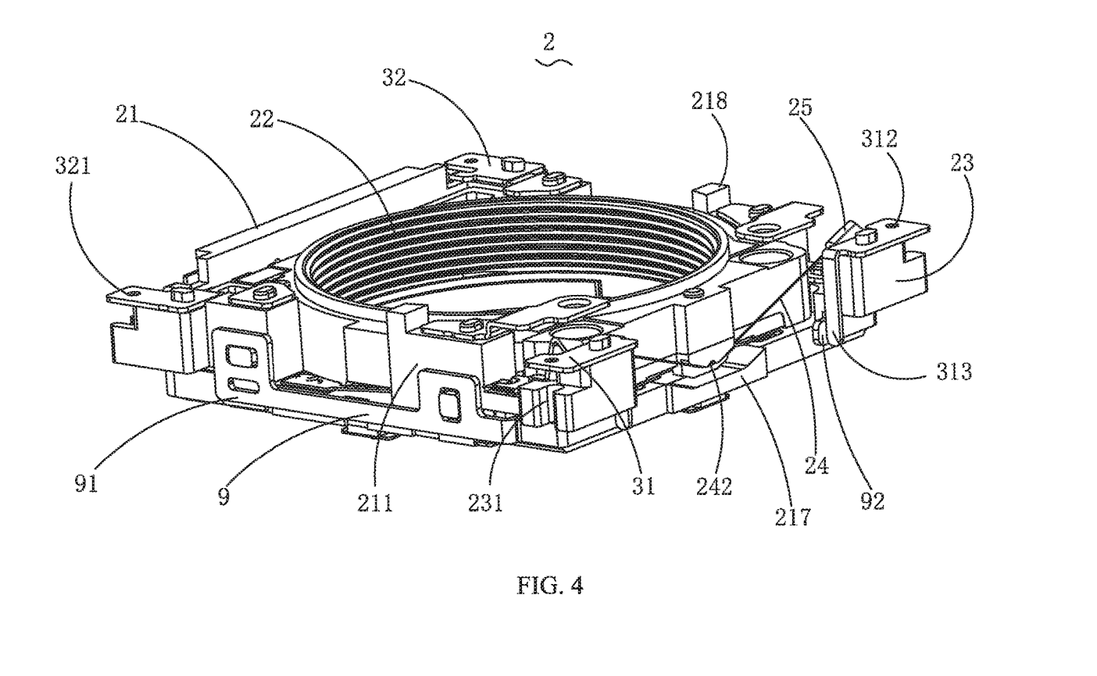
FIG. 4 is a schematic three-dimensional structural view of one angle at which a base and an electrical connector match according to the embodiment of the present disclosure.
Figure 5:
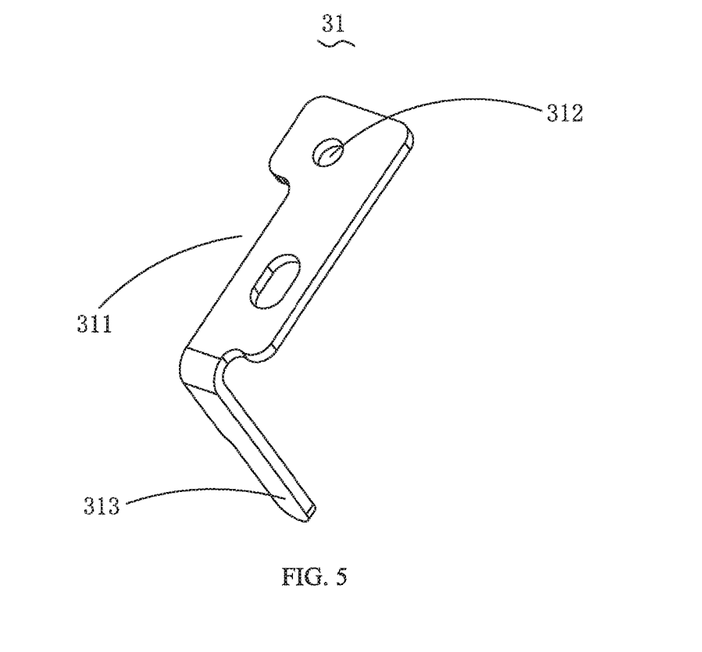
FIG. 5 is a schematic three-dimensional structural view of a first conductive member according to the embodiment of the present disclosure.
Figure 6:
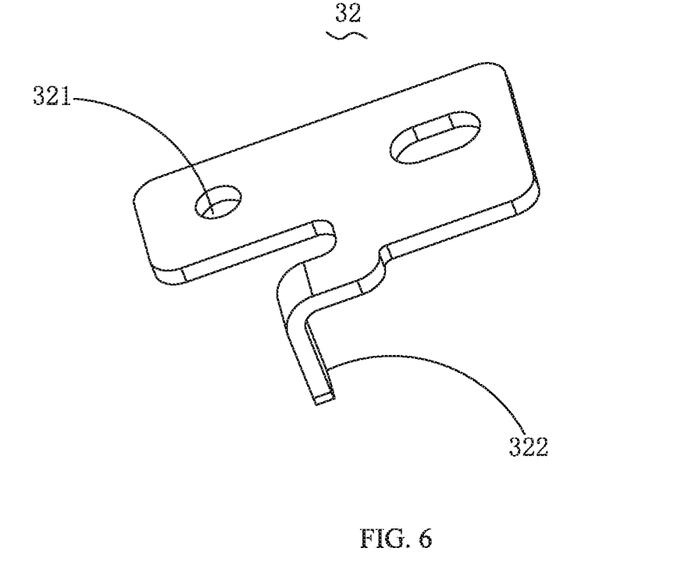
FIG. 6 is a schematic three-dimensional structural view of a second conductive member according to the embodiment of the present disclosure.
Figure 9:
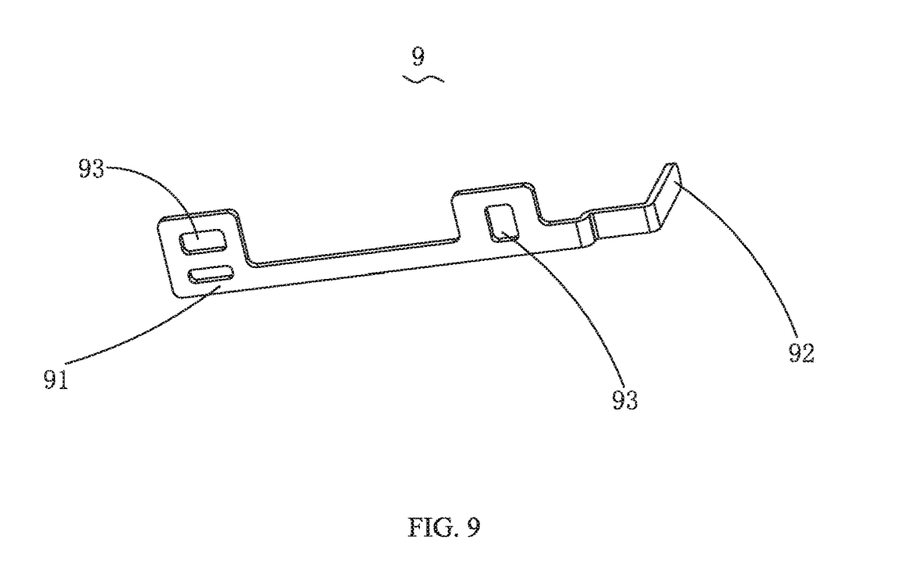
FIG. 9 is a schematic three-dimensional structural view of the electrical connector according to the embodiment of the present disclosure.
Figure 10:
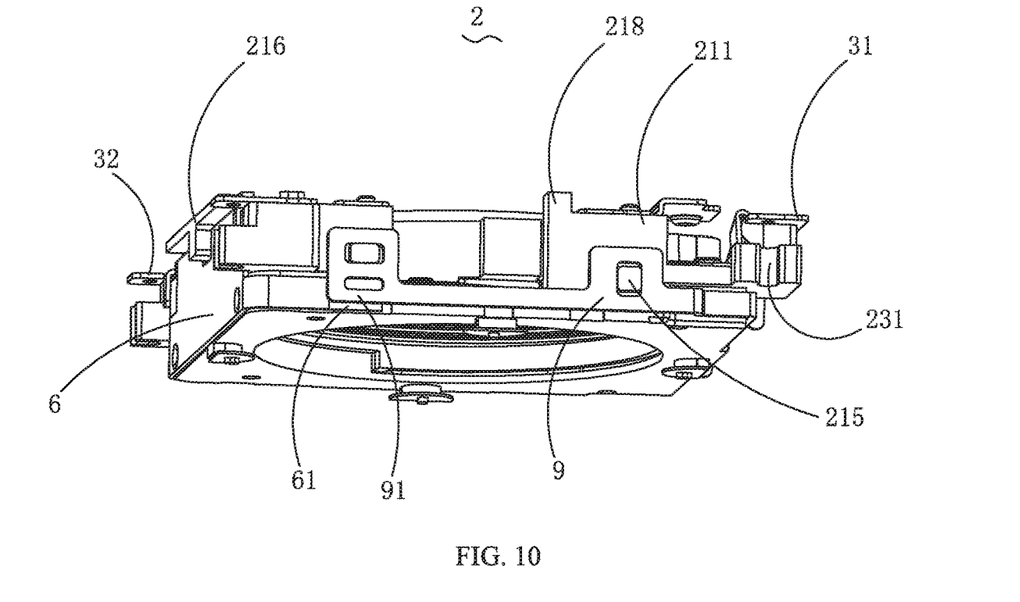
FIG. 10 is a schematic three-dimensional structural view of another angle at which the base and the electrical connector match according to the embodiment of the present disclosure.
Figure 11:
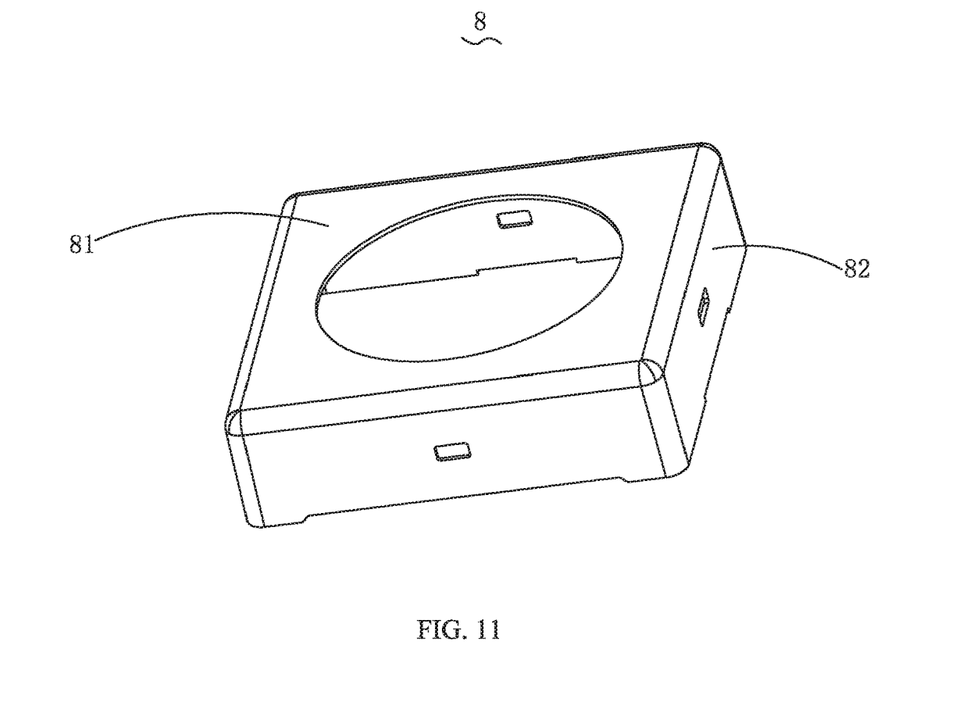
FIG. 11 is a schematic three-dimensional structural view of a housing according to the embodiment of the present disclosure.

With reference to FIG. 4 and FIGS. 9-10, the lens module 100 further includes two electrical connectors 9 disposed symmetrically. The two electrical connectors 9 are respectively attached to the first side plate 211 and the second side plate 212. Each electrical connector 9 includes a third soldering section 91 soldered to the first circuit board 6 and a fourth soldering section 92 bent to the fourth side plate 214 and soldered to the first conductive member 31. The fourth soldering section 92 is soldered to the first soldering section 313, thereby implementing electrical connection of the first conductive member 31 with the electrical connector 9. The first circuit board 6 includes two terminals 61 respectively bent and extending to the first side plate 211 and the second side plate 212. The third soldering section 91 is soldered to the terminals 61. Preferably, the electrical connector 9 is attached to the outside surfaces of the first side plate 211 and the second side plate 212, thereby avoiding contact with the drive assembly 5 set between the lens base 2 and the base 1 and avoiding short circuit. Further, the terminals 61 of the first circuit board 6 are bent and extend to the first side plate 211 and the second side plate 212, which not only makes it easy for the third soldering section 91 to be soldered to the terminals 61, but the size of the third soldering section 91 is not greatly limited, thereby making manufacture of the electrical connector 9 easier.

With reference to FIGS. 3-4, 8 and 10, the first side plate 211 and the second side plate 212 are respectively provided with a first protrusion 215 at an outside away from the optical axis. The electrical connector 9 is provided with a through hole 93 that engages with the first protrusion 215, thereby the electrical connector 9 may be further stably fixed to the first side plate 211 and the second side plate 212. The third side plate 213 is provided with a second protrusion 216 at an end away from the substrate 11 and at an outside away from the optical axis. The fourth side plate 214 is provided with a third protrusion 217 at an outside away from the optical axis. The first protrusion 215, the second protrusion 216 and the third protrusion 217 collectively define a movement of the lens base 2 in a direction perpendicular to the direction of the optical axis of the lens. In an embodiment, the first side plate 211 and the second side plate 212 are respectively provided with two first protrusions 215 in order to better fix the electrical connector 9. There are respectively distances of 0.2 mm between the first protrusions 215, the second protrusions 216, the third protrusions 217 and the corresponding frame 12. The protrusions set on the four side plates of the bottom 21 define movement of the lens base 2 in the direction perpendicular to the direction of the optical axis of the lens, thereby avoiding affecting quality of imaging due to too large amplitude of sway of the lens base 2.

Preferably, the lens module 100 further includes a housing 8 sleeved on the base 1. The housing 8 includes a top wall 81 and a side wall 82. The side wall 82 is fixed to the substrate 11, and an end of the frame 12 away from the substrate 11 is connected with the top wall. The frame 12 holds the housing 8. The first side plate and the second side plate 212 is further provided with a fourth protrusion 218 at an end away from the substrate 11. The fourth protrusion 218 is configured to define a movement of the lens base 2 in the direction of the optical axis of the lens away from the substrate 11. Therefore, the amplitude of moving up of the lens base 2 is prevented from being too large.

The above are only an embodiment of the present disclosure. It shall be noted that those of ordinary skill in the art can make improvements without departing from the creative concept of the present disclosure, and these belong to the protection scope of the present disclosure.

What is claimed is:

1. A lens module, comprising a base, a lens base and a holding assembly configured to hold the lens base; the lens base being suspended within the base by the holding assembly; the lens base comprising a connector configured to fixedly connect the holding assembly and a conductive member disposed on the connector; the connector being provided with a recess, the conductive member being provided with a connecting hole at a position facing the recess; the holding assembly comprising at least two holding members, one end of each of the holding members being fixed relative to the base while the other end of each of the holding members being soldered to the connecting hole of the conductive member through the recess, and the connecting hole being a through hole circumferentially closed;

wherein, the lens base further comprise a bottom, a lens holder with a lens and installed at the bottom, and a shape memory alloy wire configured to drive the lens holder to move in a direction of an optical axis of the lens; the bottom is provided with a binding clamp; the shape memory alloy wire comprises an end connected to the binding clamp and a drive end connected to the lens holder, and the conductive member comprises a first conductive member disposed adjacent to the binding clamp, the first conductive member and the binding clamp are opposite to each other and there is a distance between the first conductive member and the binding clamp;

wherein, the first conductive member is provided with a notch at a side facing the binding clamp, and a distance between the side with the notch of the first conductive member and the binding clamp ranging from 0.05 mm to 0.15 mm.

2. The lens module according to claim 1, wherein, the bottom is square; the bottom comprises four side plates disposed circumferentially and four corners located respectively between adjacent side plates, there are four connectors respectively disposed at corners of the bottom and extending away from a direction of a central line of the bottom; there are four holding members, and each holding member is fixedly connected to one of the connectors; one of the side plates is installed with a first circuit board; the shape memory alloy wire comprises two ends, the drive end disposed between the two ends; each of the ends is connected to one respective binding clamp, and two binding clamps are respectively fixed to two side plates opposite to each other.

3. The lens module according to claim 2, wherein, the conductive member comprises two first conductive members disposed symmetrically relative to a central line of the bottom, and two second conductive members disposed symmetrically relative to another central line of the bottom; the two first conductive members are respectively disposed at an upper end of the connector corresponding to the two binding clamps, and the two second conductive members are respectively disposed at upper ends of the other two connectors.

4. The lens module according to claim 3, wherein, the first conductive member further comprises a first soldering section bent and disposed at a side opposite to the connecting hole, and the second conductive member further comprises a second soldering section soldered to the first circuit board.

5. The lens module according to claim 4, wherein, four side plates disposed circumferentially of the bottom are considered as a first side plate, a second side plate, a third side plate and a fourth side plate; wherein a side plate installed with the first circuit board is the third side plate, the fourth side plate is opposite to the third side plate, and the first side plate and the second side plate are opposite to each other and are respectively connected between the third side plate and the fourth side plate; the lens module further comprises two electrical connectors disposed symmetrically, the two electrical connectors are respectively attached to the first side plate and the second side plate, and each electrical connector comprises a third soldering section, soldered to the first circuit board, and a fourth soldering section, that is bent to the fourth side plate and soldered to the first soldering section; the first circuit board comprises two terminals respectively bent and extending to the first side plate and the second side plate, and the third soldering section is soldered to the terminals.

6. The lens module according to claim 5, wherein, the base comprises a substrate and a frame fixed to the substrate, the substrate and the frame form an accommodating space configured to accommodate the lens base; the first side plate and the second side plate are respectively provided with a first protrusion at an outside away from the optical axis, each electrical connector is provided with a through hole corresponding to the first protrusion, and each electrical connector is engaged with the first protrusion through the through hole and the electrical connectors are respectively attached to the first side plate and the second side plate.

7. The lens module according to claim 6, wherein, the third side plate is provided with a second protrusion at an end away from the substrate and at an outside away from the optical axis, the fourth side plate is provided with a third protrusion at an outside away from the optical axis, and the first protrusion, the second protrusion and the third protrusion collectively define a movement of the lens base in a direction perpendicular to the direction of the optical axis of the lens.

8. The lens module according to claim 7, further comprising a housing sleeved on the base, the housing comprising a top wall and a side wall, the side wall fixed to the substrate, an end of the frame away from the substrate being connected with the top wall; the first side plate and the second side plate being further respectively provided with a fourth protrusion at an end away from the substrate; the fourth protrusion being configured to define a movement of the lens base in the direction of the optical axis of the lens away from the substrate.

* * * * *